US012783858B2

(12) United States Patent
Bhaskar et al.

(10) Patent No.: US 12,783,858 B2
(45) Date of Patent: Nov. 3, 2026

(54) DATA DRIFT IDENTIFICATION FOR SENSOR SYSTEMS

(71) Applicant: Ford Global Technologies, LLC, Dearborn, MI (US)

(72) Inventors: Sandhya Bhaskar, Sunnyvale, CA (US); Jinesh Jain, South San Francisco, CA (US); Nikita Jaipuria, Pittsburgh, PA (US); Shreyasha Paudel, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 994 days.

(21) Appl. No.: 18/080,799

(22) Filed: Dec. 14, 2022

(65) Prior Publication Data

US 2024/0202503 A1 Jun. 20, 2024

(51) Int. Cl.
*G06N 3/048* (2023.01)
*G06N 3/08* (2023.01)

(52) U.S. Cl.
CPC ............... *G06N 3/048* (2023.01); *G06N 3/08* (2013.01)

(58) Field of Classification Search
CPC ................................. G06N 3/048; G06N 3/08
See application file for complete search history.

(56) References Cited

U.S. PATENT DOCUMENTS 7,340,366 B2 3/2008 Aas et al.
2019/0171428 A1* 6/2019 Patton ....................... G06F 8/60
2021/0117760 A1 4/2021 Krishnan et al.
2021/0142198 A1 5/2021 Maturana et al.

OTHER PUBLICATIONS

Suprem, et. al., arXiv:2009.05440v1 [cs.CV] Sep. 9, 2020 (Year: 2020).*
Stoycheva, Mihaela, "Uncertainty Estimation in Deep Neural Object Detectors for Autonomous Driving" Degree Project in Computer Science and Engineering, KTH Royal Institute of Technology School of Electrical Engineering and Computer Science, Sweden 2020; (Year: 2020).*

(Continued)

*Primary Examiner* — Viker A Lamardo
*Assistant Examiner* — Sally T. Ley
(74) *Attorney, Agent, or Firm* — Frank A. MacKenzie; Brooks Kushman P.C.

(57) ABSTRACT

A system and method to identify a data drift in a trained object detection deep neural network (DNN) includes receiving a dataset based on real world use, wherein the dataset includes scores associated with each class in an image, including a background (BG) class, measuring an intersection-over-union (IoU) conditioned expected calibration error (ECE) IoU-ECE by calculating an ECE under a white-box setting with detections from the dataset prior to non-maximum suppression (pre-NMS detections) that are conditioned on a specific IoU threshold, upon a determination of the IoU-ECE being greater than a preset first threshold, performing a white-box temperature scaling (WB-TS) calibration on the pre-NMS detections of the dataset to extract a temperature T, and identifying that the data drift has occurred upon a determination that temperature T exceeds a preset second threshold.

20 Claims, 5 Drawing Sheets

(56) References Cited

OTHER PUBLICATIONS

Gawlikowski, et. al., arXiv:2107.03342v3 [cs.LG] Jan. 18, 2022 (Year: 2022).*
Everingham, "PASCAL Visual Object Classes", Visual Object Classes Challenge 2012 (VOC2012).
Everingham et al., "The PASCAL Visual Object Classes (VOC) Challenge", Int J Comput VisDOI 10.1007/s11263-009-0275-4.
Guo et al., "On Calibration of Modern Neural Networks", Proceedings of the 34 th International Conference on Machine Learning, Sydney, Australia, PMLR 70, 2017. Copyright 2017.
Kuppers et al., "Multivariate Confidence Calibration for Object Detection", arXiv:2004.13546v1 [cs.CV] Apr. 28, 2020.
Lin et al., "Microsoft COCO: Common Objects in Context", http://mscoco.org/, Jul. 5, 2014.
Lin et al., "Focal Loss for Dense Object Detection", Computer Vision Foundation, 2017 IEEE International Conference on Computer Vision.
Liu et al., "SSD: Single Shot MultiBox Detector", arXiv:1512.02325v5 [cs.CV] Dec. 29, 2016.
Schwaiger et al., "From Black-box to White-box: Examining Confidence Calibration under different Conditions", arXiv:2101.02971v1 [cs.CV] Jan. 8, 2021.

* cited by examiner

DATA DRIFT IDENTIFICATION FOR SENSOR SYSTEMS

BACKGROUND

Automated driving can use deep neural networks (DNNs) for various perception tasks and rely on the scores output by the perception DNNs to determine the uncertainty associated with the predicted output.

DETAILED DESCRIPTION

Figure 1:
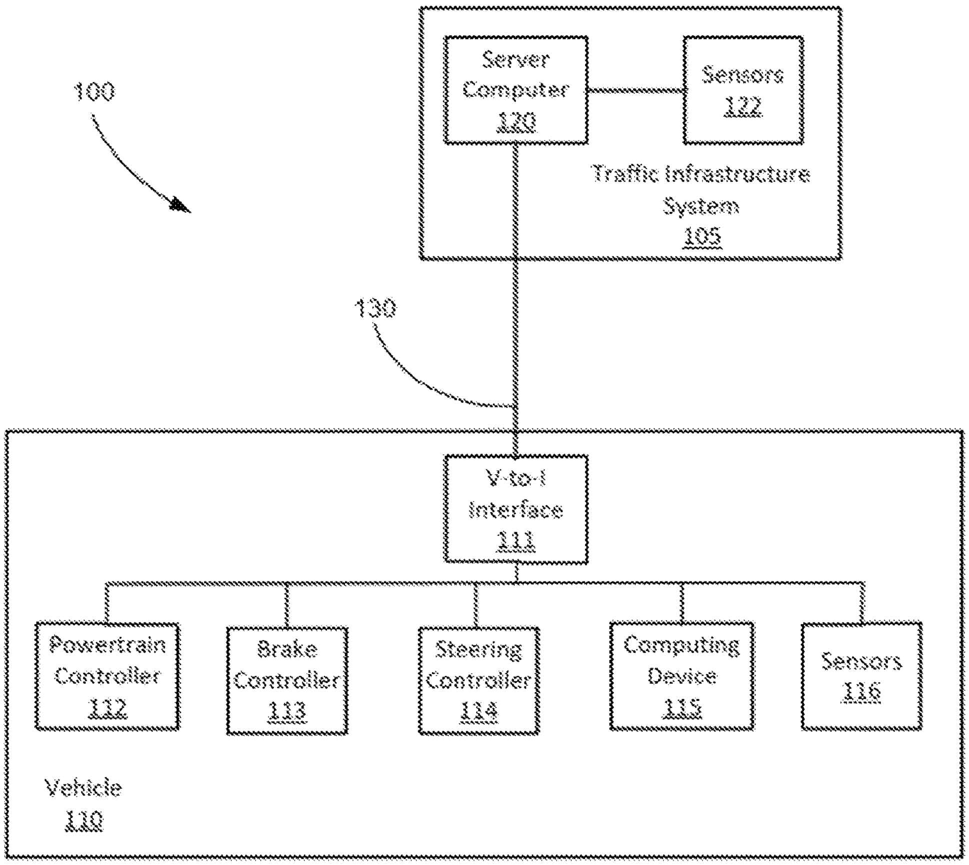
FIG. 1 is an example of a vehicular system for using a deep neural network.

An object detection deep neural network (DNN) can be trained to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Such tasks can use object detection DNNs for various perception tasks and rely on confidence scores output by the perception DNNs to determine uncertainty or reliability associated with the predicted output. Calibration of a DNN means that the DNN can predict uncertainty, i.e., a probability that DNN output accurately represents ground truth. Calibration of a DNN can depend on various factors, such as a choice of architecture, dataset, and training parameters. Mis-calibration error is a measurement of deviation of uncertainty scores from predicting the true performance accuracy of the DNN, i.e., mis-calibration means that the DNN does not accurately predict a certainty or uncertainty that its perception outputs conform to ground truth. When the confidence scores are higher than the accuracy of the model, the scores are said to be over-confident. When confidence scores are lower than the accuracy of the model, the scores are said to be under-confident.

DNN calibration can be improved as described herein. For example, the present disclosure includes a white-box temperature scaling (WB-TS) to provide calibration of object detection DNNs.

As used herein with respect to calibration of a DNN, black-box calibration refers to calibration of data after a non-maximum suppression (NMS) step, whereas white-box calibration refers to calibration of raw data, i.e., prior to any NMS step. Additionally, Platt scaling, a parametric approach to calibration, may be employed. The non-probabilistic predictions of a classifier are used as features for a logistic regression model, which is trained on a validation set to return probabilities. In the context of a NN, Platt scaling learns scalar parameters a, b∈R and outputs $\hat{q}_i=\sigma(az_i+b)$ as the calibrated probability. Parameters a and b can be optimized using the negative log likelihood (NLL) loss over the validation set.

Temperature scaling is the simplest extension Platt scaling and uses a single scalar parameter T>0 for all classes K (where K>2). Given the logit vector $z_i$, a confidence prediction is:

$$\hat{q}_i = \max_k \sigma_{SM}(z_i/T)^{(k)}$$

T is called the temperature, and it "softens" the Softmax (i.e., raises the output entropy) with T>1. As $T\rightarrow\infty$, the probability $\hat{q}_i$ approaches 1/K, which represents maximum uncertainty. With T=1, the original probability $\hat{p}_i$ is recovered. As $T\rightarrow 0$, the probability collapses to a point mass (i.e., $\hat{q}_i=1$). The temperature T is optimized with respect to NLL loss on the validation set. Accordingly, as used herein, the term "temperature" refers to a scalar parameter used in calibration (and does not refer to the degree or intensity of heat present in a substance or object).

White-box temperature scaling (WB-TS) may be used to address calibration in object detection DNNs by scaling the logit vector of pre-NMS (pre non-maximum suppression) detection boxes with a temperature value, T. Here, the temperature T is obtained using the validation dataset as the calibration dataset during the calibration stage. The calibrated scores have been found to enable reliable uncertainty estimation. However, it has also been found that the calibration levels of incoming and evolving datasets vary depending upon factors like geography and time of the day, week, or year. Indeed, such data drift may be related to conceptual shifts related to only certain kinds of data due to a new location or may be related to covariant shifts, such as shadows. As described herein, an object detection DNN can advantageously be calibrated in accordance with the incoming datasets of changed environments. Furthermore, such an adjustment to address changing environments permits ongoing training of a DNN, where the new incoming data can be further used to re-train the DNN model for unseen, new, and/or out-of-distribution (OOD) data points.

Vehicle guidance will be described herein as a non-limiting example of using an object detection DNN to detect, for example vehicles and pedestrians, in a traffic scene. A traffic scene is an environment around a traffic infrastructure system or a vehicle that can include a portion of a roadway and objects including vehicles and pedestrians, etc. For example, a computing device in a traffic infrastructure can be programmed to acquire one or more images from one or more sensors included in the traffic infrastructure system and detect objects in the images using a DNN. The images can be acquired from a still or video camera and can include range data acquired from a range sensor including a lidar sensor. The images can also be acquired from sensors included in a vehicle. A DNN can be trained to label and locate objects and determine trajectories and uncertainties in the image data or range data. A computing device included in the traffic infrastructure system can use the trajectories and uncertainties of the detected objects to determine a vehicle path upon which to operate a vehicle in an autonomous or semi-autonomous mode. A vehicle can operate based on a vehicle path by determining commands to direct the vehicle's powertrain, braking, and steering components to operate the vehicle to travel along the path.

Vehicles operating based on a vehicle path determined by a deep neural network can benefit from detecting objects on or near the vehicle path and determining whether to continue on the vehicle path, stop, or determine a new vehicle path that avoids the object.

In one or more implementations of the present disclosure, a system includes a computer including a processor and a memory, the memory storing instructions executable by the processor programmed to: identify a data drift in a trained object detection deep neural network (DNN). This is accomplished by: receiving a dataset based on real world use, wherein the dataset includes scores associated with each class in an image, including a background (BG) class; measuring an intersection-over-union (IoU) conditioned expected calibration error (ECE) IoU-ECE by calculating an ECE under a white-box setting with detections from the dataset prior to non-maximum suppression (pre-NMS detections) that are conditioned on a specific IoU threshold; upon a determination of the IoU-ECE being greater than a preset first threshold, performing a white-box temperature scaling (WB-TS) calibration on the pre-NMS detections of the dataset to extract a temperature T; and identifying that the data drift has occurred upon a determination that temperature T exceeds a preset second threshold.

In an implementation, the system may further include instructions to use the extracted temperature T to calibrate incoming data upon identifying the data drift.

In another implementation, incoming data may be calibrated by uniformly scaling logit vectors associated with the pre-NMS detections of the object detection DNN with the temperature T prior to a Sigmoid/Softmax layer.

In a further implementation, the system may further include instructions to perform additional learning on the object detection DNN upon identifying the data drift.

In an implementation the IoU-ECE is $$IoU{-}ECE = \sum_{m=1}^{M} \frac{|B_m|}{n} |acc(B_m) - conf(B_m)|$$

where n is the number of IoU-conditioned samples, M is a number of interval bins (=15) and Bm is a set of indices of samples whose prediction scores fall in an interval Im=(m−1/M, m/M].

In an implementation, the specific IoU threshold may be set to be the same as an IoU threshold used for training the object detection DNN.

In another implementation, the instructions for performing the WB-TS calibration on the pre-NMS detections of the dataset to extract the temperature T may include instructions to: retrieve the dataset, wherein the dataset includes scores associated with each object class in an image, including a background (BG) class; determine background ground truth boxes in the dataset by comparing ground truth boxes with detection boxes generated by the object detection DNN using an intersection over union (IoU) threshold; correct for class imbalance between the ground truth boxes and the background ground truth boxes in a ground truth class by updating the ground truth class to include a number of background ground truth boxes based on a number of ground truth boxes in the ground truth class; and determine a single scalar parameter of the temperature T for all classes by optimizing for a negative log likelihood (NLL) loss.

In an implementation, the preset first threshold may be in a range of 2 to 4 times an IoU-ECE value calculated from a held out validation dataset and the preset second threshold may be in a range of 2 to 4 times a temperature T extracted from the held out validation dataset.

In another implementation, the system may include instructions to: after the Sigmoid/Softmax layer, perform non-maximum suppression on calibrated confidence scores with corresponding bounding box predictions to obtain final detections; and actuate a vehicle component based upon an object detection determination of the object detection DNN.

In a further implementation, the instructions to correct for class imbalance may include instructions to: determine an average number of pre-NMS detection boxes in non-BG classes as k; and extract a top k pre-NMS detection boxes in the BG class using corresponding model scores.

In one or more implementations of the present disclosure, a method to identify a data drift in a trained object detection deep neural network (DNN) may be performed by: receiving a dataset based on real world use, wherein the dataset includes scores associated with each class in an image, including a background (BG) class; measuring an intersection-over-union (IoU) conditioned expected calibration error (ECE) IoU-ECE by calculating an ECE under a white-box setting with detections from the dataset prior to non-maximum suppression (pre-NMS detections) that are conditioned on a specific IoU threshold; upon a determination of the IoU-ECE being greater than a preset first threshold, performing a white-box temperature scaling (WB-TS) calibration on the pre-NMS detections of the dataset to extract a temperature T; and identifying that the data drift has occurred upon a determination that temperature T exceeds a preset second threshold.

In an implementation, the method may further include using the extracted temperature T to calibrate incoming data upon identifying the data drift.

In another implementation, incoming data may be calibrated by uniformly scaling logit vectors associated with the pre-NMS detections of the object detection DNN with the temperature T prior to a Sigmoid/Softmax layer.

In an implementation, the method may further include performing additional learning on the object detection DNN upon identifying the data drift.

In another implementation, the IoU-ECE may be $$IoU{-}ECE = \sum_{m=1}^{M} \frac{|B_m|}{n} |acc(B_m) - conf(B_m)|$$

where n is the number of IoU-conditioned samples, M is a number of interval bins (=15) and Bm is a set of indices of samples whose prediction scores fall in an interval Im=(m−1/M, m/M].

In a further implementation, the specific IoU threshold may be set to be the same as an IoU threshold used for training the object detection DNN.

In an implementation, performing the WB-TS calibration on the pre-NMS detections of the dataset to extract the temperature T may include: retrieving the dataset, wherein the dataset includes scores associated with each object class in an image, including a background (BG) class; determining background ground truth boxes in the dataset by comparing ground truth boxes with detection boxes generated by the object detection DNN using an intersection over union (IoU) threshold; correcting for class imbalance between the ground truth boxes and the background ground truth boxes in a ground truth class by updating the ground truth class to include a number of background ground truth boxes based on a number of ground truth boxes in the ground truth class; and determining a single scalar parameter of the temperature T for all classes by optimizing for a negative log likelihood (NLL) loss.

In another implementation, the preset first threshold may be in a range of 2 to 4 times an IoU-ECE value calculated from a held out validation dataset and the preset second threshold may be in a range of 2 to 4 times a temperature T extracted from the held out validation dataset.

In an implementation, the method may further include: after the Sigmoid/Softmax layer, performing non-maximum suppression on calibrated confidence scores with corresponding bounding box predictions to obtain final detections; and actuating a vehicle component based upon an object detection determination of the object detection DNN.

In another implementation, correcting for class imbalance may include: determining an average number of pre-NMS detection boxes in non-BG classes as k; and extracting a top k pre-NMS detection boxes in the BG class using corresponding model scores.

FIG. 1 is a diagram of an object detection system 100 that can include a traffic infrastructure system 105 that includes a server computer 120 and sensors 122. Object detection system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route).

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
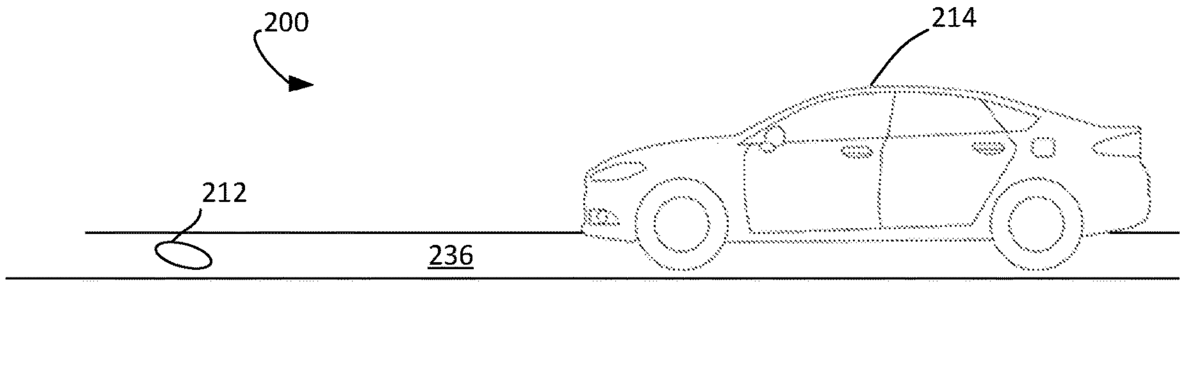
FIG. 2 is an example traffic scene.

FIG. 2 is a diagram of an image of a traffic scene 200. The image of the traffic scene 200 can be acquired by a sensor 122 included in a traffic infrastructure system 105 or a sensor 116 included in a vehicle 110. The image of the traffic scene 200 includes a vehicle 214 on a roadway 236. Also included in traffic scene 200 is an object 212 that may be identified and located in order to determine a possible need for a new path.

Image classification includes predicting the class of an object in an image. In contrast, object detection for perception purposes, e.g., in a vehicle for vehicle operation, further includes object localization, which refers to identifying the location of one or more objects in an image and drawing a bounding box around their extent(s).

As discussed above, in temperature scaling, a single scalar value, i.e., temperature T, is used to scale the classification network's non-probabilistic output before the Softmax layer, i.e., logit vector $z_i \in RC$ corresponding to the input image $I_i$, where C is the number of classes. In equation 1, $\hat{p}_i$ is the calibrated model score of the predicted class for image $I_i$. ("Logit" herein has the standard mathematical definition of a function that is the inverse of the standard logistic function). T is obtained by optimizing for negative log likelihood (NLL) on the calibration dataset. For random variables $X \in \chi$ (input) and $Y \in \rho = \{1, \ldots, C\}$ (class label) with ground truth joint distribution $\pi(X, Y)$, given a probabilistic model $\hat{\pi}(X, Y)$ and n samples, the negative log likelihood is defined by equation 2.

$$\hat{p}_i = \max_{k=1}^{C}\left(\sigma_{softmax}\left(z_{ik}/T\right)\right) \tag{1}$$

$$NLL = -\sum_{i=1}^{n} \log(\hat{\pi}(y_i \mid x_i)) \tag{2}$$

Advantageously, calibrating performance of a DNN model in conjunction with the temperature T, extracted for a new (incoming) dataset, can enable detection of mis-calibration. This detection can be used to calibrate an object detection DNN model to an evolving dataset and use the new incoming samples for ongoing or continuing learning. This is particularly useful in the autonomous vehicle domain where a deployed object detection DNN is typically exposed to new geographical locations and may operate at different times of the day, week, and year (where lighting, shadows, foliage, traffic, etc. may vary). White-box temperature scaling (WB-TS) uses expected calibration error (ECE) as a metric for scalar summary of calibration. ECE measures mis-calibration by quantifying the gap between accuracy and confidence as shown by equation 3:

$$ECE = \sum_{m=1}^{M} \frac{|B_m|}{n} |acc(B_m) - conf(B_m)|, \tag{3}$$

In equation 3, n is the number of samples, M is the number of interval bins (=15) and Bm is the set of indices of samples whose prediction scores fall in the interval Im=(m−1/M, m/M]. Lower ECE indicates better network calibration. Since the present disclosure conducts ECE evaluation under the white-box setting with pre-NMS detections conditioned on a specific IoU threshold, it is referred to herein as an IoU conditioned ECE (IoU-ECE).

In an example, a DNN in the form of a single shot multibox detector (SSD) MobilenetV2 model (see Liu, Wei, et al. "Ssd: Single shot multibox detector." European conference on computer vision. Springer, Cham, 2016) was trained on VOC 2007 (V07) (Everingham, Mark, et al. "The pascal visual object classes (voc) challenge." International journal of computer vision 88.2 (2010): 303-338) and VOC 2012 (V12) (http://host.robots.ox.ac.uk/pascal/VOC/voc2012/) datasets. WB-TS calibration was performed and mis-calibration error was tested for in various test tests, as shown in Table 1.

TABLE 1

WB-TS calibration performance of SSD trained on $V_{07}$ and $V_{12}$ and calibrated using six different calibration (cal.) sets. IoU-ECE is shown for both the calibration and held-out test sets.

| | | | IoU-ECE of cal. | | IoU-ECE of test | |
|---|---|---|---|---|---|---|
| Cal. | Test | T | Before | After | Before | After |
| $S_1$ | $V_{07}$ | 1.348 | 10.40 | 6.34 | 31.37 | 25.98 |
| $S_2$ | $V_{07}$ | 1.302 | 8.94 | 5.36 | 31.37 | 26.71 |
| $S_3$ | $V_{07}$ | 1.321 | 9.61 | 5.86 | 31.37 | 26.40 |
| $S_4$ | $V_{07}$ | 1.326 | 9.74 | 5.89 | 31.37 | 26.32 |
| $S_5$ | $V_{12}$ | 1.350 | 10.30 | 5.89 | 9.8 | 5.36 |
| $S_6$ | $C_{17}$ | 3.076 | 56.71 | 16.06 | 54.80 | 14.60 |

To investigate the effect of varying calibration sets on temperature T, the trained SSD model was calibrated on six different sets—$S_1$-$S_6$. $S_1$, $S_2$, $S_3$ are the first 40%, last 40% and randomly sampled 40% subsets of the V07 validation set. $S_4$ is the same as the V07 validation set. $S_5$ and $S_6$ are the 70% subsets of V12 and MSCOCO 2017 (C17) (Lin, Tsung-Yi, et al. "Microsoft coco: Common objects in context." European conference on computer vision. Springer, Cham, 2014) validation sets (remaining after sampling for the held-out 30% subsets for testing). Note that T is consistently >1, which indicates that the model is over-confident to begin with, per Guo et al. For $S_1$-$S_5$, both before and after calibration, T and IoU-ECE for the calibration sets are similar. This is because $S_1$-$S_5$ are derived from the same data distribution as the training set, i.e., V07 and V12 validation sets. Changing the calibration set to $S_6$ derived from a completely different dataset, i.e., C17, results in a significant increase in T (3.076) and IoU-ECE (56.71%). Such a prominent increase in both the T value and the pre-calibration IoU-ECE indicates that a combination of the two can act as a reliable predictor of data drift.

Figure 3:
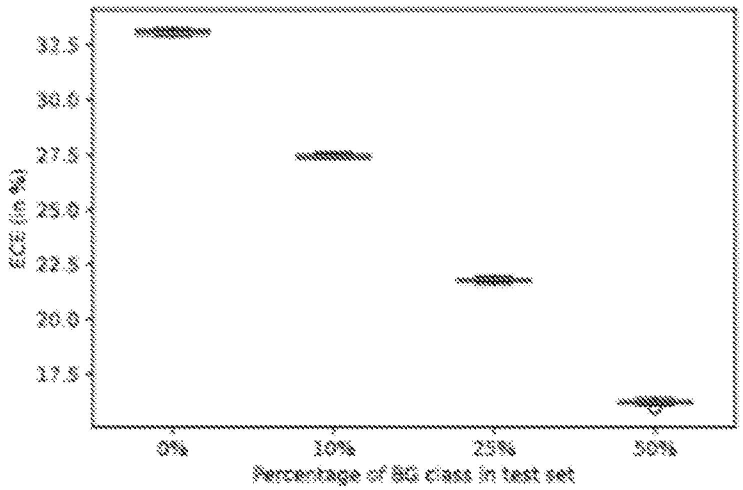
FIG. 3 illustrates box plots for expected calibration error (ECE) values obtained with different percentages of background (BG) class samples to show the impact of class imbalance on the ECE value.

However, this is true only if the label shift condition is satisfied. A main challenge that arises when using the ECE metric is the impact of class imbalance on the output measure. For examples, FIG. 3 shows the box plots for ECE values obtained with different percentages of background (BG) class samples in the V07 test set, for an SSD model trained on V07 and V12 datasets. It can be seen that when the test set comprises of 50% of BG class samples, the ECE value drops to almost half the value observed in the absence the BG class samples, thus under-estimating the mis-calibration incurred by non-BG classes. Therefore, to correctly detect data drift in evolving datasets, there should be no label shift caused by class imbalance.

Figure 4:
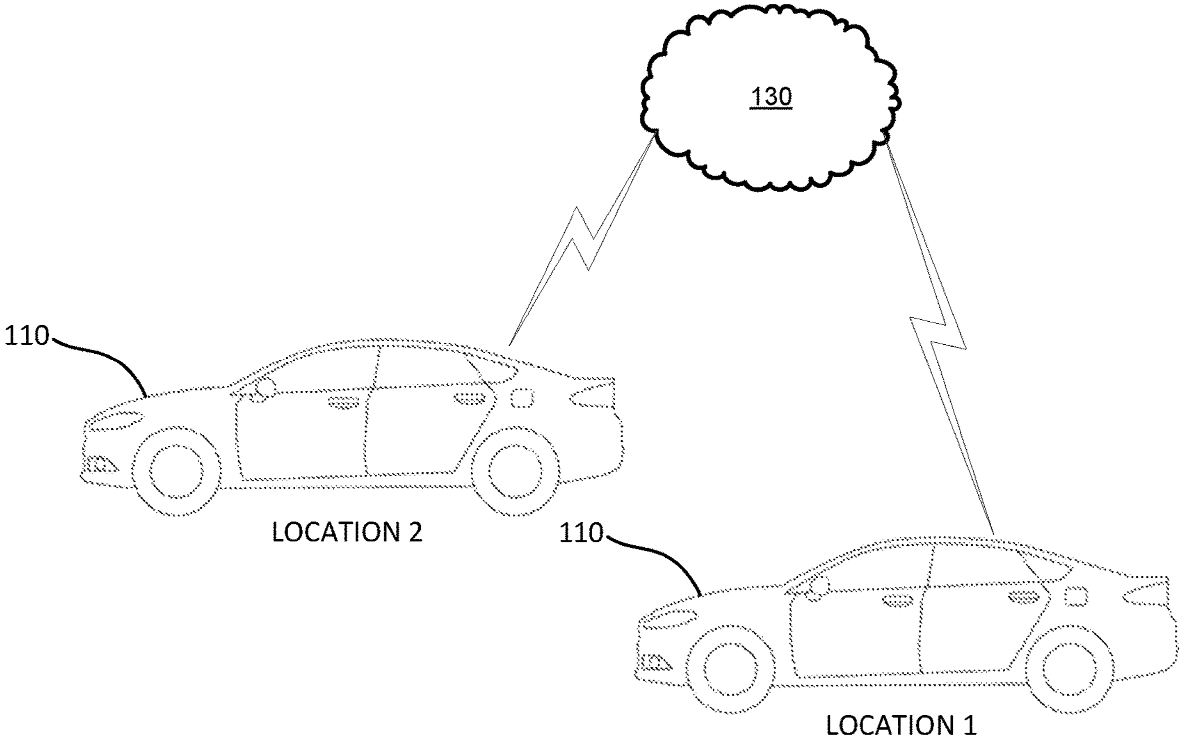
FIG. 4 illustrates an example of a data drift detection process flow.

Once such a dataset shift is detected in evolving datasets, not only can the new T value ensure robust calibration to the new setting, but the incoming dataset samples can also be used to further prepare the deployed object detection model to the new geography/scene via advanced continual learning methods. This is illustrated in FIG. 4 where an autonomous vehicle 110 (forming a part of a distributed vehicle network) moves from Location 1 to Location 2. The new incoming data (evolving dataset) may be uploaded to network 130 where, for example, it may be obtained by server computer 120 and processed according to a data drift detection process flow 300 as described with respect to other Figures.

Figure 5:
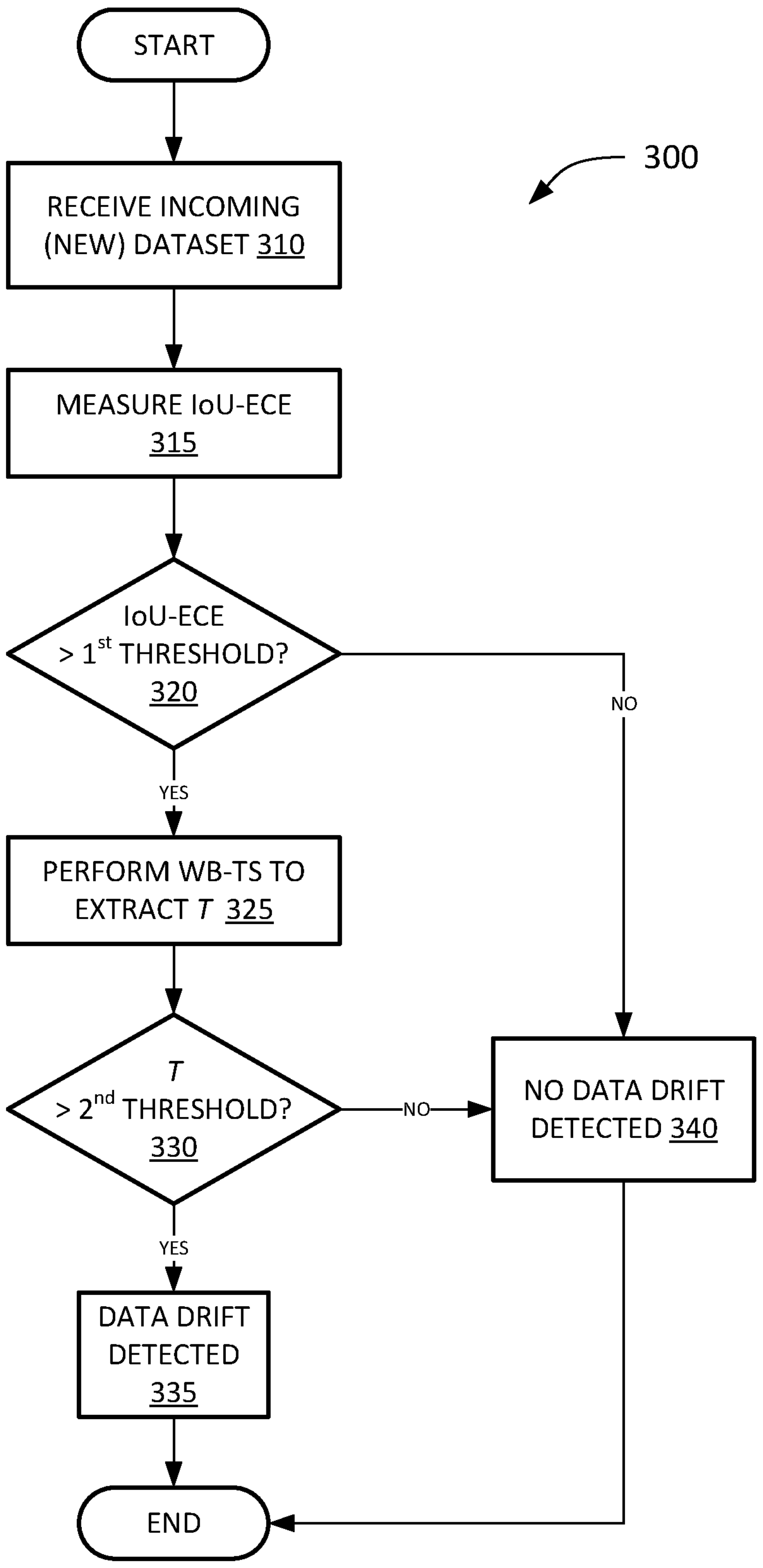
FIG. 5 illustrates an example flow diagram of a data drift process flow.

With reference to FIG. 5, a flow diagram of data drift detection process flow 300 is illustrated. In a first block 310, the data drift detection process flow 300 receives new incoming data, such as from vehicle 102 at Location 2.

Next, at block 315, the pre-calibration IoU-ECE value is measured.

At block 320, it is determined whether the IoU-ECE value is higher than a preset first threshold. The preset first threshold may be in a range of 2 to 4 times an IoU-ECE value calculated from a held out validation/calibration dataset. For example, if the IoU-ECE value calculated for the held out validation/calibration dataset is 10, the preset first threshold may be set to 3 times this value, and be set at 30.

If it is determined that the IoU-ECE value is not higher than the preset first threshold at block 320 ("no"), then no data drift is detected, at block 340. If it is determined that the IoU-ECE value is higher than the preset first threshold at block 320 ("yes"), then WB-TS calibration is performed on the incoming dataset at block 325 to extract the temperature value T.

The value T extracted in the block 325 is then measured against a preset second threshold at block 330. The preset second threshold may be in a range of 2 to 4 times a temperature T extracted from the held out validation dataset. For example, if the extracted temperature T from the held out validation/calibration dataset is 1.2, the preset second threshold may be set to 3 times this value, and be set at 3.6.

If the value of T is not higher than the preset second threshold ("no"), then no data drift is detected, at block 340. If the value of T is higher than the preset second threshold at block 330 ("yes"), then data drift is detected at block 335. In such a case, the users may be notified of data drift and further action may be taken, such as using the extracted T for calibration of future incoming data and/or performing continual learning, both of which enable robustness to such a data drift. This robustness permits reliable predictions and corresponding uncertainty estimation through output confidence scores of the DNN. This is useful to autonomous driving, where vehicles are continually exposed to new environments/settings based upon changes in geography and time.

WB-TS when combined with IoU-ECE can enable detection of data drift in datasets. In addition to detecting such drifts, WB-TS can correct for mis-calibration in evolving datasets with the retrieved temperature T. For the SSD MobilenetV2 model described above, on testing for OOD samples, incorrect detections with high confidence have been observed prior to calibration. Post-calibration, the output scores have been observed to be more reliable with removal of incorrect detections.

Figure 6:
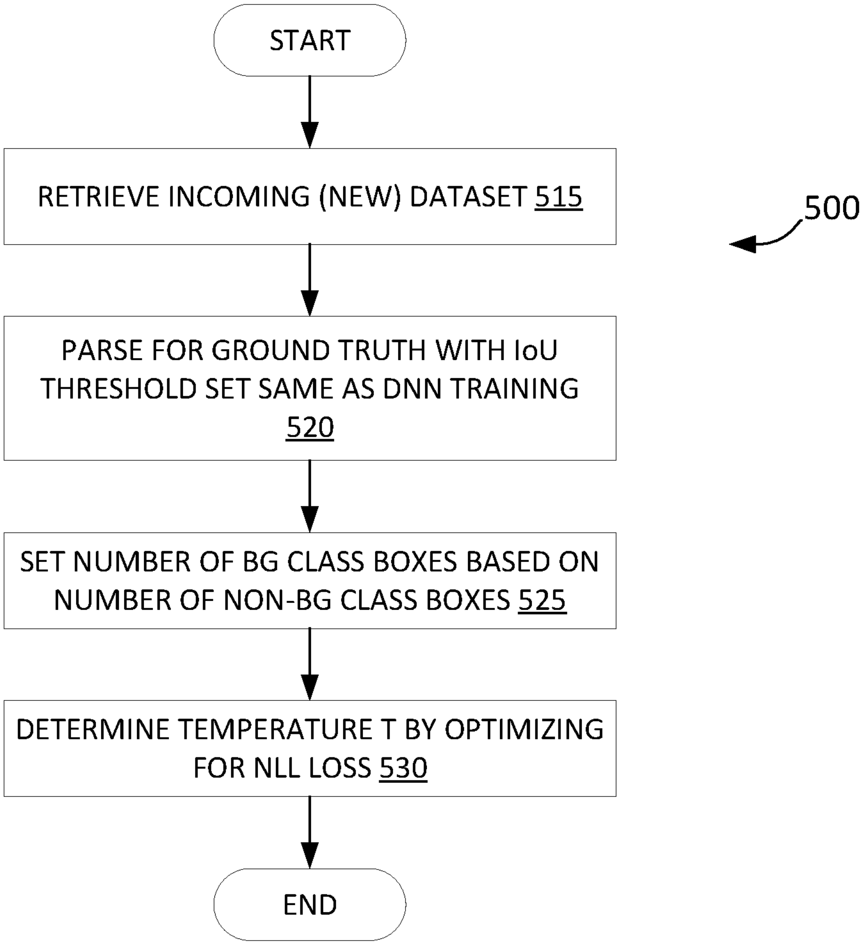
FIG. 6 is an example flow diagram of a white-box temperature scaling (WB-TS) process.

With reference to FIG. 6, an example of a flow diagram of a WB-TS process 500 is illustrated.

At a first block 515, the incoming (new) dataset is retrieved. The incoming dataset includes scores associated with all object classes in an image, including the background (BG) class.

Next, at block 520, the method parses for ground truth in the incoming dataset using an intersection over union (IoU) threshold that is set the same as the IoU threshold used for training the objection detection DNN. Here, background ground truth boxes in the incoming dataset are determined by comparing ground truth boxes with detection boxes generated by the object detection DNN using the IoU threshold.

To correct for possible class imbalance if there are many more BG class detections than non-BG class detections, at block 525 the number of BG class boxes for each image is limited based upon the number of non-BG class boxes to be approximately the same. For example, an average number of pre-NMS detection boxes in non-BG classes may be determined as k, and a top k pre-NMS detection boxes in the BG class may be selected using corresponding model scores.

Next, at block 530, a scalar value of the temperature T may be determined by optimizing for the NLL loss. Since the temperature T is determined on the dataset that includes the BG class and is prior to any non-maximum suppression, this is a white-box (WB) calibration.

Figure 7:
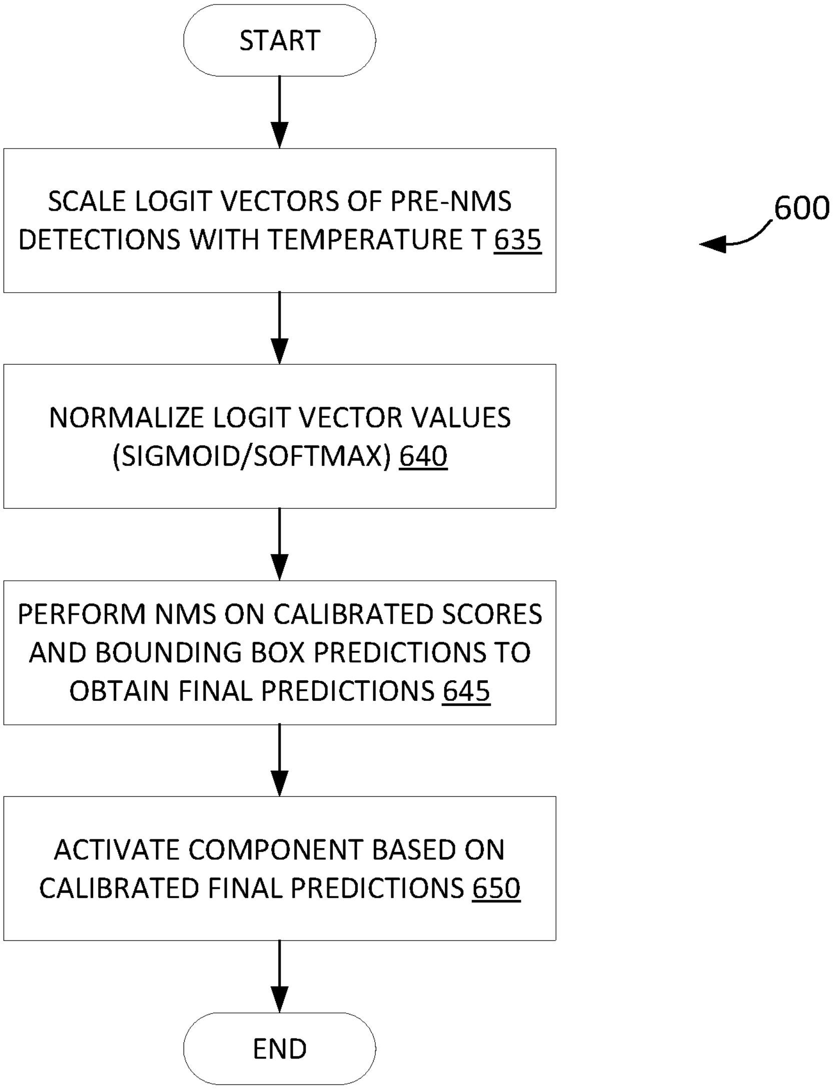
FIG. 7 is an example flow diagram of a data calibration process.

With reference to FIG. 7, an example of a flow diagram of a corrective action process 600 is illustrated. As noted above with respect to FIG. 5, if the value of T is higher than the preset second threshold at block 330 ("yes"), then data drift is detected at block 335. When data drift is detected, one corrective action is using the determined temperature T for calibration of future incoming data.

At a first block 635, the determined temperature T is used to scale logit vectors of pre-NMS detections.

Next, at block 640, the logit vector values are normalized to values between 0 and 1, such as with a Sigmoid or Softmax layer.

At block 645, the method performs non-maximum suppression on the calibrated scores and bounding box predictions to obtain final predictions from the object detection DNN.

At block 650, the calibrated final predictions from the objection detection DNN may be used to activate a component, such as a steering or braking component of a vehicle. For example, a computing device 115 in a vehicle could execute programming based on the predictions and/or other data to actuate vehicle components, e.g., to avoid an object, maintain a vehicle on a path, etc.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system, such as one of those mentioned above, and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor programmed to:

identify a data drift in a trained object detection deep neural network (DNN) by:

receiving a dataset based on real world use, wherein the dataset includes scores associated with each class in an image, including a background (BG) class;

measuring an intersection-over-union (IoU) conditioned expected calibration error (ECE) IoU-ECE by calculating an ECE, under a white-box setting, with outputs from the object detection deep neural network (DNN) in the dataset prior to non-maximum suppression (pre-NMS detections) that satisfy a specific IoU threshold;

upon a determination of the IoU-ECE being greater than a preset first threshold, performing a white-box temperature scaling (WB-TS) calibration on the pre-NMS detections of the dataset to extract a temperature T; and identifying that the data drift has occurred upon a determination that temperature T exceeds a preset second threshold.

2. The system of claim 1, further comprising instructions to use the extracted temperature T to calibrate incoming data upon identifying the data drift.

3. The system of claim 2, wherein incoming data is calibrated by uniformly scaling logit vectors associated with the pre-NMS detections of the object detection DNN with the temperature T prior to a Sigmoid/Softmax layer.

4. The system of claim 1, further comprising instructions to perform additional learning on the object detection DNN upon identifying the data drift.

5. The system of claim 1, wherein the IoU-ECE is $$IoU\text{-}ECE = \sum_{m=1}^{M} \frac{|B_m|}{n} |acc(B_m) - conf(B_m)|$$

where n is the number of IoU-conditioned samples, Mis a number of interval bins (=15) and $B_m$ is a set of indices of samples whose prediction scores fall in an interval $I_m$=(m−1/M, m/M].

6. The system of claim 1, wherein the specific IoU threshold is set to be the same as an IoU threshold used for training the object detection DNN.

7. The system of claim 1, wherein the instructions for performing the WB-TS calibration on the pre-NMS detections of the dataset to extract the temperature T include instructions to:

retrieve the dataset, wherein the dataset includes scores associated with each object class in an image, including a background (BG) class;

determine background ground truth boxes in the dataset by comparing ground truth boxes with detection boxes generated by the object detection DNN using an intersection over union (IoU) threshold;

correct for class imbalance between the ground truth boxes and the background ground truth boxes in a ground truth class by updating the ground truth class to include a number of background ground truth boxes based on a number of ground truth boxes in the ground truth class; and determine a single scalar parameter of the temperature T for all classes by optimizing for a negative log likelihood (NLL) loss.

8. The system of claim 1, wherein the preset first threshold is in a range of 2 to 4 times an IoU-ECE value calculated from a held out validation dataset and the preset second threshold is in a range of 2 to 4 times a temperature T extracted from the held out validation dataset.

9. The system of claim 3, further including instructions to:

after the Sigmoid/Softmax layer, perform non-maximum suppression on calibrated confidence scores with corresponding bounding box predictions to obtain final detections; and actuate a vehicle component based upon an object detection determination of the object detection DNN.

10. The system of claim 7, wherein the instructions to correct for class imbalance include instructions to:

determine an average number of pre-NMS detection boxes in non-BG classes as k; and extract a top k pre-NMS detection boxes in the BG class using corresponding model scores.

11. A method to identify a data drift in a trained object detection deep neural network (DNN) by:

receiving a dataset based on real world use, wherein the dataset includes scores associated with each class in an image, including a background (BG) class;

measuring an intersection-over-union (IoU) conditioned expected calibration error (ECE) IoU-ECE by calculating an ECE, under a white-box setting, with outputs from the object detection deep neural network (DNN) in the dataset prior to non-maximum suppression (pre-NMS detections) that satisfy a specific IoU threshold;

upon a determination of the IoU-ECE being greater than a preset first threshold, performing a white-box temperature scaling (WB-TS) calibration on the pre-NMS detections of the dataset to extract a temperature T; and identifying that the data drift has occurred upon a determination that temperature T exceeds a preset second threshold.

12. The method of claim 11, further comprising using the extracted temperature T to calibrate incoming data upon identifying the data drift.

13. The method of claim 12, wherein incoming data is calibrated by uniformly scaling logit vectors associated with the pre-NMS detections of the object detection DNN with the temperature T prior to a Sigmoid/Softmax layer.

14. The method of claim 11, further comprising performing additional learning on the object detection DNN upon identifying the data drift.

15. The method of claim 11, wherein the IoU-ECE is $$IoU{-}ECE = \sum_{m=1}^{M} \frac{|B_m|}{n} |acc(B_m) - conf(B_m)|$$

where n is the number of IoU-conditioned samples, Mis a number of interval bins (=15) and $B_m$ is a set of indices of samples whose prediction scores fall in an interval $I_m=(m-1/M, m/M]$.

16. The method of claim 11, wherein the specific IoU threshold is set to be the same as an IoU threshold used for training the object detection DNN.

17. The method of claim 11, wherein performing the WB-TS calibration on the pre-NMS detections of the dataset to extract the temperature T includes:

retrieving the dataset, wherein the dataset includes scores associated with each object class in an image, including a background (BG) class;

determining background ground truth boxes in the dataset by comparing ground truth boxes with detection boxes generated by the object detection DNN using an intersection over union (IoU) threshold;

correcting for class imbalance between the ground truth boxes and the background ground truth boxes in a ground truth class by updating the ground truth class to include a number of background ground truth boxes based on a number of ground truth boxes in the ground truth class; and determining a single scalar parameter of the temperature T for all classes by optimizing for a negative log likelihood (NLL) loss.

18. The method of claim 11, wherein the preset first threshold is in a range of 2 to 4 times an IoU-ECE value calculated from a held out validation dataset and the preset second threshold is in a range of 2 to 4 times a temperature T extracted from the held out validation dataset.

19. The method of claim 13, further including:

after the Sigmoid/Softmax layer, performing non-maximum suppression on calibrated confidence scores with corresponding bounding box predictions to obtain final detections; and actuating a vehicle component based upon an object detection determination of the object detection DNN.

20. The method of claim 17, wherein correcting for class imbalance includes:

determining an average number of pre-NMS detection boxes in non-BG classes as k; and extracting a top k pre-NMS detection boxes in the BG class using corresponding model scores.

* * * * *